(12) United States Patent
Murasawa et al.

(10) Patent No.: US 11,499,456 B2
(45) Date of Patent: Nov. 15, 2022

(54) EXHAUST PURIFICATION DEVICE AND EXHAUST PURIFICATION METHOD

(71) Applicant: Isuzu Motors Limited, Tokyo (JP)

(72) Inventors: Naoto Murasawa, Fujisawa (JP); Akio Nishikata, Fujisawa (JP); Masahiro Kajiyama, Fujisawa (JP); Takayuki Mukunashi, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 17/273,332

(22) PCT Filed: Sep. 4, 2019

(86) PCT No.: PCT/JP2019/034759
§ 371 (c)(1),
(2) Date: Mar. 4, 2021

(87) PCT Pub. No.: WO2020/050310
PCT Pub. Date: Mar. 12, 2020

(65) Prior Publication Data
US 2021/0324773 A1    Oct. 21, 2021

(30) Foreign Application Priority Data
Sep. 5, 2018   (JP) .............................. JP2018-165801

(51) Int. Cl.
*F01N 3/035*   (2006.01)
*F01N 9/00*   (2006.01)
(Continued)

(52) U.S. Cl.
CPC ............. *F01N 3/035* (2013.01); *F01N 3/021* (2013.01); *F01N 3/025* (2013.01); *F01N 3/103* (2013.01);
(Continued)

(58) Field of Classification Search
CPC .......... F01N 3/035; F01N 3/021; F01N 3/025; F01N 3/103; F01N 3/106; F01N 9/002;
(Continued)

(56) References Cited

U.S. PATENT DOCUMENTS

2010/0101213 A1   4/2010   Tuomivaara et al.
2015/0275801 A1   10/2015  Nagoako et al.
(Continued)

FOREIGN PATENT DOCUMENTS

CN   103967566 A  *  8/2014   ............. F01N 9/002
CN   104718366       6/2015
(Continued)

OTHER PUBLICATIONS

International Search Report and the Written Opinion dated Dec. 3, 2019 From the International Searching Authority Re. Application No. PCT/JP2019/034759 and Its Translation of Search Report Into English. (9 Pages).

*Primary Examiner* — Audrey B. Walter

(57) ABSTRACT

Provided are an exhaust purification device and an exhaust purification method which can achieve improved fuel efficiency. The exhaust purification device (100) is equipped with: a DOC (5) for occluding hydrocarbons in an exhaust gas; a DPF (6) that is provided downstream from the DOC (5) and is for trapping particulate matter in the exhaust gas; and an ECU (10) for determining, in accordance with the amount of occluded hydrocarbons in the DOC (5), a start time for a regeneration process for removing particulate matter accumulated in the DPF (6).

5 Claims, 3 Drawing Sheets

(51) Int. Cl.
*F02D 41/02* (2006.01)
*F02D 41/40* (2006.01)
*F01N 3/021* (2006.01)
*F01N 3/10* (2006.01)
*F01N 3/025* (2006.01)
*F01N 3/08* (2006.01)
*F02D 41/14* (2006.01)

(52) U.S. Cl.
CPC ............ *F01N 3/106* (2013.01); *F01N 9/002* (2013.01); *F02D 41/029* (2013.01); *F02D 41/402* (2013.01); *F02D 41/403* (2013.01); *F02D 41/405* (2013.01); *F01N 3/0835* (2013.01); *F01N 2430/06* (2013.01); *F02D 41/1439* (2013.01)

(58) Field of Classification Search
CPC .. F01N 3/0835; F01N 2430/06; F02D 41/029; F02D 41/402; F02D 41/403; F02D 41/405; F02D 41/1439
See application file for complete search history.

(56) References Cited

U.S. PATENT DOCUMENTS

| | | | |
|---|---|---|---|
| 2016/0369681 | A1 | 12/2016 | Jonouchi et al. |
| 2017/0074144 | A1 | 3/2017 | Muramoto et al. |

FOREIGN PATENT DOCUMENTS

| | | |
|---|---|---|
| CN | 105339616 | 2/2016 |
| EP | 2253823 | 11/2010 |
| JP | 2004-036543 | 2/2004 |
| JP | 2004-060582 | 2/2004 |
| JP | 2008-128170 | 6/2008 |
| JP | 2009-121264 | 6/2009 |
| JP | 2009-185668 | 8/2009 |
| JP | 2010-031833 | 2/2010 |
| JP | 2010-519459 | 6/2010 |
| JP | 2010-265873 | 11/2010 |
| JP | 2011-247140 | 12/2011 |
| JP | 2012-241594 | 12/2012 |
| JP | 2015-161293 | 9/2015 |
| WO | WO 2020/050310 | 3/2020 |

* cited by examiner

EXHAUST PURIFICATION DEVICE AND EXHAUST PURIFICATION METHOD

TECHNICAL FIELD

The present disclosure relates to an exhaust purification device and an exhaust purification method.

BACKGROUND ART

As an exhaust purification device for purifying an exhaust gas discharged from an internal combustion engine, a device including an oxidation catalyst and a collection filter has been known, heretofore (e.g., see Patent Literature (hereinafter, referred to as "PTL") 1).

The oxidation catalyst, when in an active state, oxidizes hydrocarbon (HC) and carbon monoxide (CO) contained in the exhaust gas, and when in a non-active state, occludes HC contained in the exhaust gas.

The collection filter is provided at a subsequent stage of the oxidation catalyst, and collects a particulate matter (hereinafter, referred to as "PM") in the exhaust gas. The collected PM is deposited in the collection filter.

The exhaust purification device performs a process of removing the PM deposited in the collection filter. This process is performed, for example, by injecting a fuel into a cylinder of the internal combustion engine. As the fuel is burned with the oxidation catalyst, the temperature of the exhaust gas rises, and thus, the PM deposited in the collection filter burns.

CITATION LIST

Patent Literature

PTL 1

Japanese Unexamined Patent Application Publication (Translation of PCT Application) No. 2010-519459

SUMMARY OF INVENTION

Technical Problem

In the conventional exhaust purification device, however, there is room for improvement in terms of the fuel efficiency related to the above-mentioned process.

An object of the present disclosure is thus to provide an exhaust purification device and an exhaust purification method each realizing an improvement in fuel efficiency.

Solution to Problem

An exhaust purification device according to one aspect of the present disclosure includes: an oxidation catalyst for occluding a hydrocarbon in an exhaust gas; a collection filter provided on a downstream side from the oxidation catalyst and collecting a particulate matter in the exhaust gas; and a control section that determines, in accordance with an occluded amount of the hydrocarbon in the oxidation catalyst, a start timing of regeneration processing for removing the particulate matter deposited in the collection filter.

An exhaust purification method according to one aspect of the present disclosure is a method in a device including an oxidation catalyst for occluding a hydrocarbon in an exhaust gas, and a collection filter provided on a downstream side from the oxidation catalyst and collecting a particulate matter in the exhaust gas, the exhaust purification method including: determining, in accordance with an occluded amount of the hydrocarbon in the oxidation catalyst, a start timing of regeneration processing for removing the particulate matter deposited in the collection filter.

Advantageous Effects of Invention

According to the present disclosure, an improvement in fuel efficiency can be realized.

DESCRIPTION OF EMBODIMENTS

Hereinafter, an embodiment of the present disclosure will be described in detail with reference to the accompanying drawings.

Configuration

Figure 1:
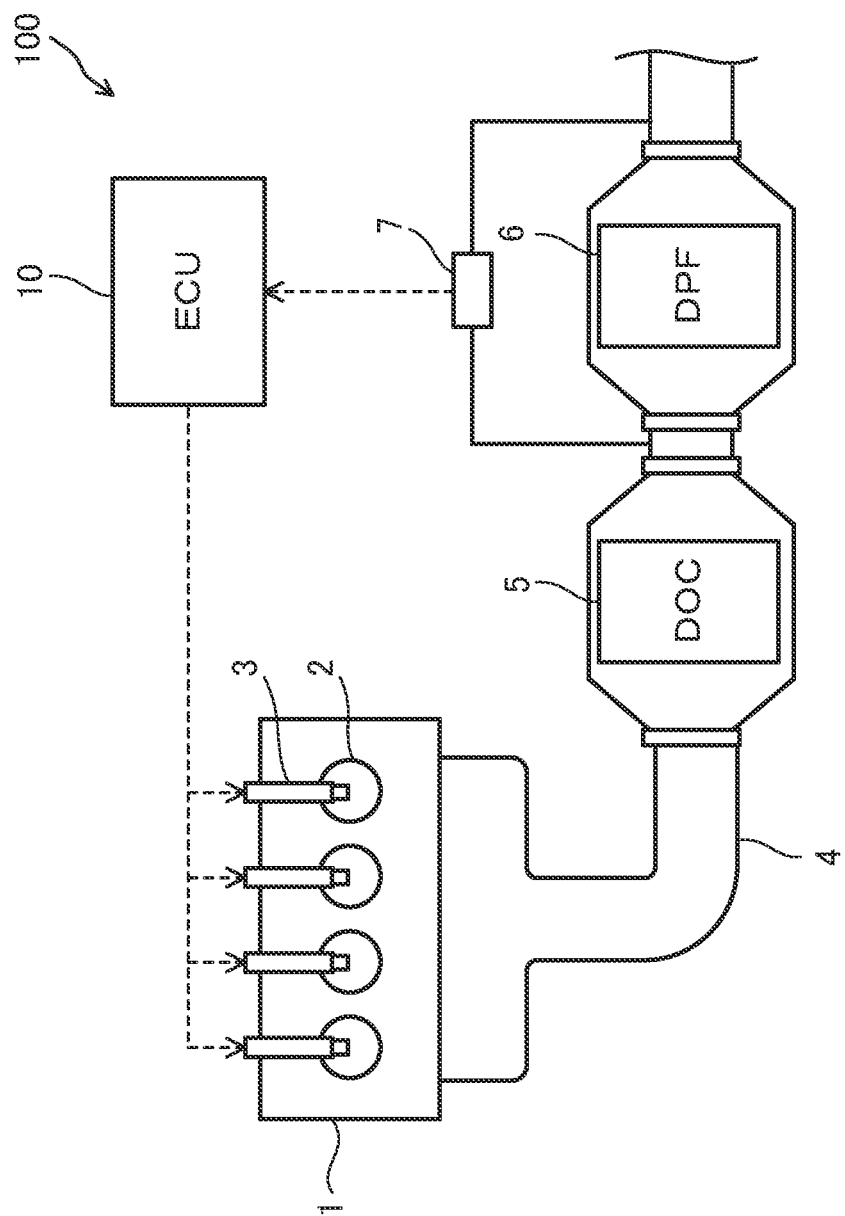
FIG. 1 is a diagram schematically illustrating an internal combustion engine and an exhaust purification device according to an embodiment of the present disclosure.

First, internal combustion engine 1 and exhaust purification device 100 according to the embodiment of the present disclosure will be described with reference to FIG. 1. FIG. 1 is a diagram schematically illustrating internal combustion engine 1 and exhaust purification device 100 according to the present embodiment. In FIG. 1, broken-line arrows indicate a flow of an electrical signal.

Internal combustion engine 1 and exhaust purification device 100 illustrated in FIG. 1 are mounted, for example, in a vehicle.

Internal combustion engine 1 is, for example, a diesel engine. Internal combustion engine 1 is provided with four cylinders 2. Each of cylinders 2 is provided with fuel injection device 3 for injecting a fuel into cylinder 2. The operation of each fuel injection device 3 is controlled by ECU 10 to be described, hereinafter.

Further, exhaust pipe 4 through which the exhaust gas generated by internal combustion engine 1 flows is connected to internal combustion engine 1. The exhaust gas discharged from internal combustion engine 1 flows from the left side to the right side of FIG. 1.

Exhaust purification device 100 includes Diesel Oxidation Catalyst (DOC) 5, Diesel Particulate Filter (DPF) 6, and Electric Control Unit (ECU) 10. DOC 5 and DPF 6 are provided along exhaust pipe 4 in this order.

Note that DOC 5 corresponds to an example of the "oxidation catalyst." DPF 6 corresponds to an example of the "collection filter." ECU 10 corresponds to an example of the "control section."

DOC 5, when in an active state, oxidizes HC and CO contained in the exhaust gas and when in a non-active state, occludes HC contained in the exhaust gas.

DPF 6 collects PM contained in the exhaust gas. The collected PM is deposited in DPF 6. DPF 6 is formed of, for example, porous ceramics or the like having a microporous diameter.

Differential pressure sensor 7 detects a differential pressure between an upstream-side pressure and a downstream-side pressure of DPF 6 as needed. Differential pressure sensor 7 outputs a signal indicating a differential pressure that has been detected (hereinafter, referred to as "detected differential pressure") to ECU 10.

ECU 10 is a control device for controlling the injection amount and the injection timing of a fuel injected from fuel injection device 3.

Although illustration is omitted, ECU 10 includes, as hardware, for example, a Central Processing Unit (CPU), a Read Only Memory (ROM), a Random Access Memory (RAM) and/or the like. The functions of ECU 10 to be described in this embodiment are realized by executing, on the RAM, a computer program read from the ROM by the CPU.

Figure 2:
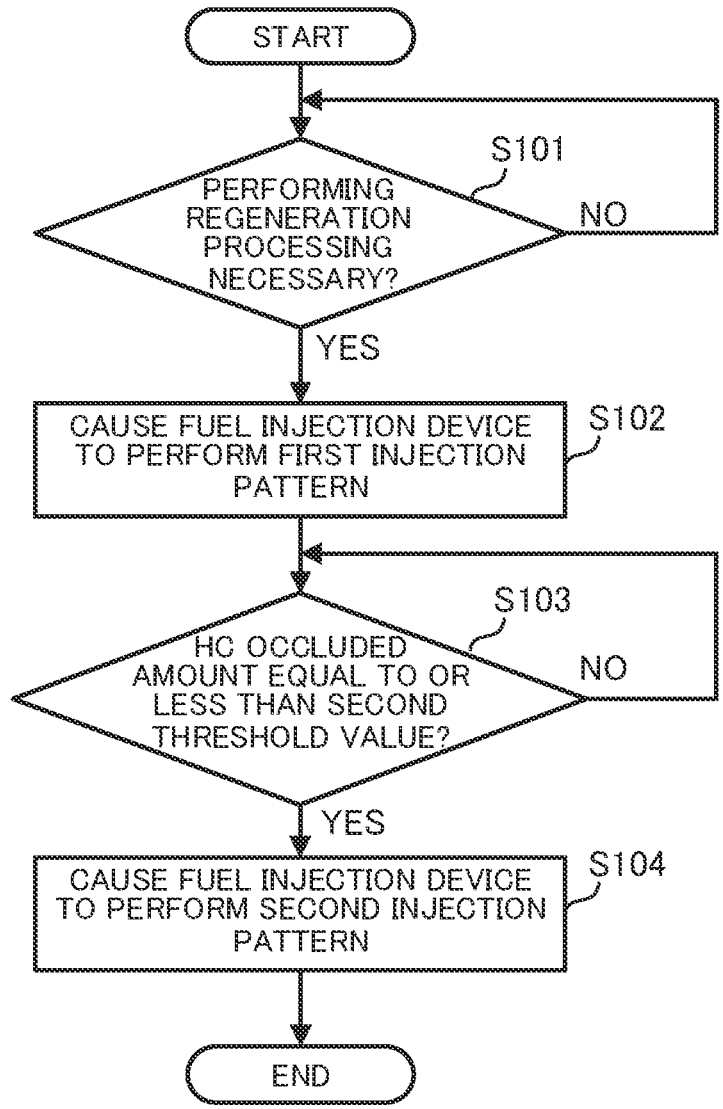
FIG. 2 is a flowchart of an operation of an ECU according to the embodiment of the present disclosure.

Although a description will be given hereinafter with reference to FIG. 2, ECU 10 controls fuel injection device 3 such that fuel injection device 3 performs the first injection pattern and the second injection pattern in this order.

At that time, when the occluded amount of HC in DOC 5 after the first injection pattern is performed becomes equal to or less than a predetermined value (second threshold value to be described, hereinafter), ECU 10 causes fuel injection device 3 to perform the second injection pattern. In other words, ECU 10 prevents fuel injection device 3 from performing the second injection pattern until the occluded amount of HC in DOC 5 after the first injection pattern is performed becomes equal to or less than the predetermined value after the first injection pattern is performed.

The first injection pattern and the second injection pattern are each a multi-stage injection process that includes a plurality of times of fuel injection processing. Further, in the second injection pattern, the number of times of fuel injection processing is large as compared with the first injection pattern. The processing of performing the second injection pattern after performing the first injection pattern corresponds to the "regeneration processing" to be described, hereinafter.

The first injection pattern includes a pilot injection, pre-injection, main injection, and after-injection, for example. In this case, the pilot injection, pre-injection, main injection, and after-injection are performed in this order.

The second injection pattern includes a pilot injection, pre-injection, main injection, after-injection and post-injection, for example. In this case, the pilot injection, pre-injection, main injection, after-injection and post-injection are performed in this order. Note that, the second injection pattern may include, instead of the post-injection, an exhaust pipe injection for directly injecting a fuel into exhaust pipe 4.

Operation

Next, a description will be given of an operation of ECU 10 with reference to FIG. 2. FIG. 2 is a flowchart of the operation of ECU 10. The flow illustrated in FIG. 2 is started, for example, when internal combustion engine 1 starts.

First, ECU 10 determines whether or not regeneration processing needs to be performed (step S101).

The regeneration processing is a process of regenerating DPF 6 by removing PM deposited in DPF 6.

In step S101, for example, ECU 10 determines whether or not the detected differential pressure is equal to or greater than the first threshold value.

The first threshold value is a lower limit value of the differential pressure that allows for determining that the regeneration processing needs to be performed. The first threshold value is set based on a result of a previously performed experiment or simulation.

In a case where the detected differential pressure is less than the first threshold value, ECU 10 determines that the regeneration processing does not need to be performed (S101: NO). In this case, the flow returns to step S101. Then, ECU 10 again determines whether or not the detected differential pressure is equal to or greater than the first threshold value.

Meanwhile, in a case where the detected differential pressure is equal to or greater than the first threshold value, ECU 10 determines that the regeneration processing needs to be performed (step S101: YES) and causes fuel injection device 3 to perform the first injection pattern (step S102). Thus, fuel injection device 3 performs the first injection pattern.

After the first injection pattern is performed, ECU 10 determines whether or not the occluded amount of HC in DOC 5 (hereinafter, referred to as "HC occluded amount) is equal to or less than the second threshold value (S103). With this determination, the start timing of the second injection pattern is determined.

The second threshold value is an upper limit value of the HC occluded amount which does not cause a damage for DOC 5 due to a rapid temperature rise that occurs when the HC occluded in DOC 5 burns. The second threshold value is set based on a result of a previously performed experiment or simulation. The second threshold value corresponds to an example of the "preset occluded amount."

The HC occluded amount can be calculated using a publicly known method. The HC occluded amount, for example, is calculated by subtracting an HC consumption amount from an HC supply amount to DOC 5.

The HC supply amount can be found, for example, by a predetermined function or map based on the fuel injection amount of fuel injection device 3 and the temperature of DOC 5. The temperature of DOC 5 can be detected by a sensor (not illustrated) and/or the like.

The HC consumption amount can be found by a predetermined function or map based on the flow rate of an exhaust gas, the temperature of DOC 5, and/or the HC deposition amount. A NOx emission amount can be calculated based on the fuel injection amount of fuel injection device 3.

Note that the method of calculating the HC occluded amount may be a publicly known method other than the method described above.

ECU 10 itself may calculate the HC occluded amount, or ECU 10 may receive information indicating the HC occluded amount calculated by another device (e.g., another ECU).

Hereinafter, the description returns to FIG. 2.

When the HC occluded amount is equal to or less than the second threshold value (step S103: NO), ECU 10 again determines whether or not the HC occluded amount is equal to or less than the second threshold value (step S103).

Meanwhile, in a case where the HC occluded amount is equal to or less than the second threshold value (step S103: YES), ECU 10 causes fuel ejection device 3 to perform the second ejection pattern (step S104). Thus, fuel injection device 3 performs the second injection pattern. Note that, the start timing of the second injection pattern may be a time point at which the HC occluded amount becomes equal to or less than the second threshold value, or may be a time point at which a predetermined time elapses from the time point.

Operational Effects

Figure 3:
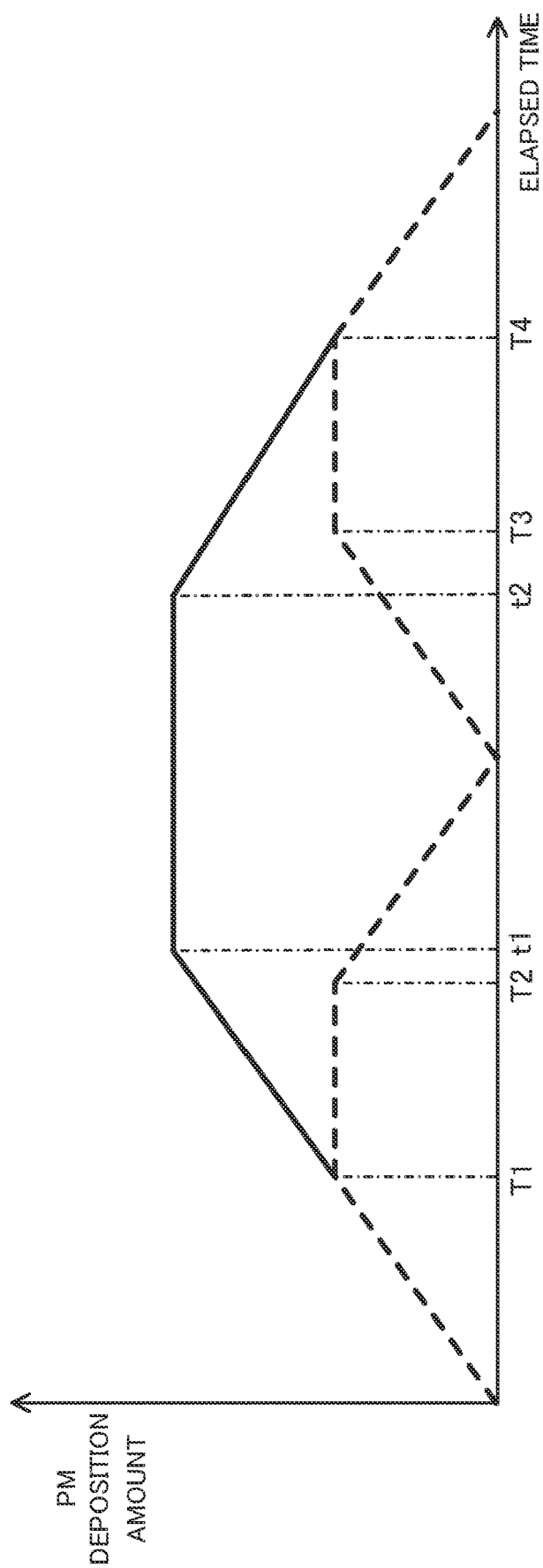
FIG. 3 is a diagram illustrating changes in the PM deposition amount according to each of the embodiment and a comparative example of the present disclosure.

Next, the operational effects of the present embodiment will be described with reference to FIG. 3. FIG. 3 is a diagram illustrating changes in the PM deposition amount (the amount of PM deposited in DPF) according to each of the embodiment and a comparative example of the present disclosure. In FIG. 3, the horizontal axis indicates the elapsed time while the vertical axis indicates the PM deposition amount.

First, the comparative example will be described. The broken line in FIG. 3 indicates the changes in the PM deposition amount of the comparative example. Note that the description will be given, herein, based on an assumption that the configuration of the exhaust purification device according to the comparative example is the same as the configuration illustrated in FIG. 1.

In the comparative example, for example, in a case where the HC occluded amount reaches the second threshold value, the first injection pattern is performed. This is because performing the first injection pattern in a case where the HC occluded amount is greater than the second threshold value causes a rapid temperature rise due to burning of a large amount of HC and damages the DOC. Timing T1 indicated in FIG. 3 is the start timing of the first injection pattern.

When the first injection pattern is performed by fuel injection device 3, a fuel is supplied to DOC 5. As a result, DOC 5 generates heat, and the HC occluded in DOC 5 burns. Accordingly, the HC occluded amount decreases (not illustrated). Meanwhile, as indicated by the broken line after timing T1 of FIG. 3, the PM deposition amount does not decrease.

When the first injection pattern ends, the second injection pattern is subsequently performed. Timing T2 indicated in FIG. 3 is the start timing of the second injection pattern.

When the second injection pattern is performed by fuel injection device 3, a fuel is supplied to DOC 5. As a result, DOC 5 generates heat, and the temperature of the exhaust gas passing through DOC 5 rises. Then, when the high-temperature exhaust gas is supplied to DPF 6, the PM deposited in DPF 6 burns. Thus, as indicated by the broken line after timing T2 of FIG. 3, the PM deposition amount decreases.

The series of operations described above is repeatedly performed. Timing T3 indicated in FIG. 3 is the start timing of the first injection pattern, and timing T4 indicated in FIG. 3 is the start timing of the second injection pattern.

Next, the present embodiment will be described. The solid line in FIG. 3 indicates the changes in the PM deposition amount in the present embodiment.

As described above, in the present embodiment, in a case where the detected differential pressure is equal to or greater than the first threshold value, the first injection pattern is performed. Timing t1 indicated in FIG. 3 is the start timing of the first injection pattern.

When the first injection pattern is performed by fuel injection device 3, as with the comparative example described above, the HC occluded in DOC 5 burns due to the heat generated by DOC 5, and the HC occluded amount decreases (illustration is omitted). Meanwhile, as indicated by the solid line after timing t1 in FIG. 3, the PM deposition amount does not decrease.

In the present embodiment, after timing t1, whether or not the HC occluded amount becomes equal to or less than the second threshold value is determined. In a case where the HC occluded amount becomes equal to or less than the second threshold value as a result of the determination, the second injection pattern is performed. Timing t2 indicated in FIG. 3 is the start timing of the second injection pattern.

As described above, in the present embodiment, the second injection pattern is not performed until the HC occluded amount becomes equal to or less than the second threshold value after timing t1. The reason for this is to prevent DOC 5 from being damaged due to a rapid temperature rise due to burning of a large amount of HC as in the case of the comparative example described above.

Further, performing the second injection pattern after the HC occluded amount becomes equal to or less than the second threshold makes it possible to reduce the number of times of performing the first injection pattern and the second injection pattern. For example, as indicated in FIG. 3, the number of times of performing the first injection pattern and the second injection pattern when viewed at the same elapsed time is twice for each of the first and the second injection patterns in the comparative example, while the number of times of performing the first injection pattern and the second injection pattern when viewed at the same elapsed time is once for each of the first and the second injection patterns in the present embodiment. Therefore, in the present embodiment, it is made possible to reduce the amount of fuel injected in the first injection pattern and the second injection pattern, thus enabling an improvement in fuel consumption.

The embodiment of the present disclosure has been described thus far, but the present disclosure is not limited to the above-described embodiment and can be implemented by appropriately modifying the present disclosure within a scope not departing from the gist of the present disclosure.

For example, in the present embodiment, a description has been given with the case where a fuel is injected into cylinder 2, as an example, but the present disclosure is not limited to this case. For example, a fuel may be injected into exhaust pipe 4.

Further, for example, in the present embodiment, a description has been given with the case where the first injection pattern is performed when the detected differential pressure is equal to or greater than the first threshold value, but the present disclosure is not limited to this case. For example, the PM deposition amount of DPF 6 may be calculated using a publicly known method, and the first injection pattern may be performed when the calculated value of PM deposition amount is equal to or greater than a preset threshold value.

This application is based on Japanese Patent Application No. 2018-165801, filed on Sep. 5, 2018, the contents of which are incorporated herein by reference.

INDUSTRIAL APPLICABILITY

The exhaust purification device and the exhaust purification method of the present disclosure are useful for purifying an exhaust gas discharged from an internal combustion engine.

REFERENCE SIGNS LIST

1 Internal combustion engine
2 Cylinder
3 Fuel injection device
4 Exhaust pipe
5 DOC 6 DPF
7 Differential pressure sensor
10 ECU
100 Exhaust purification device

The invention claimed is:

1. An exhaust purification device, comprising:
an oxidation catalyst for occluding a hydrocarbon in an exhaust gas;
a collection filter provided on a downstream side from the oxidation catalyst and collecting a particulate matter in the exhaust gas; and
a controller that determines, in accordance with an occluded amount of the hydrocarbon in the oxidation catalyst, a start timing of regeneration processing for removing the particulate matter deposited in the collection filter, wherein
the controller causes a fuel injection device to perform a first injection pattern including a plurality of times of fuel injection processing, in a case where performing the regeneration processing is necessary, and
the controller causes the fuel injection device to perform a second injection pattern including a greater number of times of the fuel injection processing than that of the first injection pattern, in a case where the occluded amount of the hydrocarbon becomes equal to or less than a preset occluded amount after the first injection pattern starts.

2. The exhaust purification device according to claim 1, wherein the first injection pattern includes a pilot injection, a pre-injection, a main injection, and an after-injection, and
the second injection pattern includes a pilot injection, a pre-injection, a main injection, an after-injection, and a post injection or an exhaust pipe injection.

3. The exhaust purification device according to claim 1, wherein
the preset occluded amount is an upper limit value of the occluded amount of the hydrocarbon which does not cause a damage for the oxidation catalyst due to a rapid temperature rise that occurs when the hydrocarbon occluded in the oxidation catalyst burns.

4. An exhaust purification method in a device including an oxidation catalyst for occluding a hydrocarbon in an exhaust gas, and a collection filter provided on a downstream side from the oxidation catalyst and collecting a particulate matter in the exhaust gas, the exhaust purification method comprising:
determining, in accordance with an occluded amount of the hydrocarbon in the oxidation catalyst, a start timing of regeneration processing for removing the particulate matter deposited in the collection filter,
performing, by a fuel injection device, a first injection pattern including a plurality of times of fuel injection processing, in a case where performing the regeneration processing is necessary, and
performing, by the fuel injection device, a second injection pattern including a greater number of times of the fuel injection processing than that of the first injection pattern, in a case where the occluded amount of the hydrocarbon becomes equal to or less than a preset occluded amount after the first injection pattern starts.

5. The exhaust purification method according to claim 4, wherein
the preset occluded amount is an upper limit value of the occluded amount of the hydrocarbon which does not cause a damage for the oxidation catalyst due to a rapid temperature rise that occurs when the hydrocarbon occluded in the oxidation catalyst burns.

* * * * *